Sept. 16, 1952  G. RALSTON ET AL  2,611,020
CRYSTAL OSCILLATOR ULTRAMICROMETER
Filed March 16, 1949  2 SHEETS—SHEET 1
Fig. 1a.
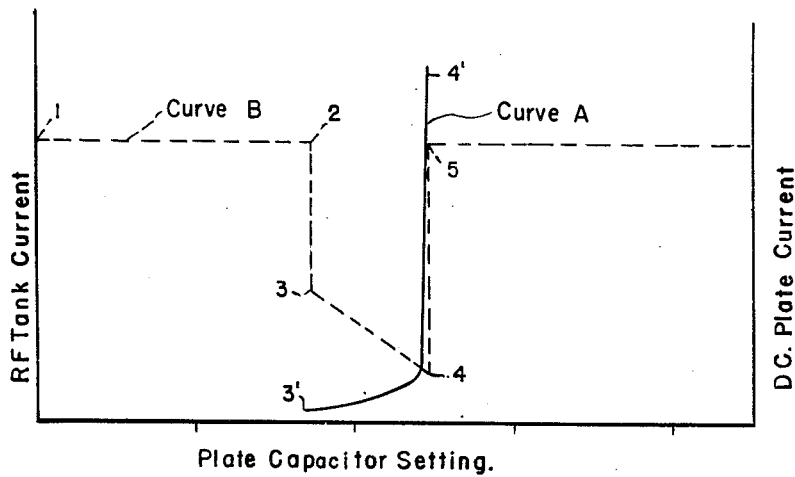
Fig. 1b.
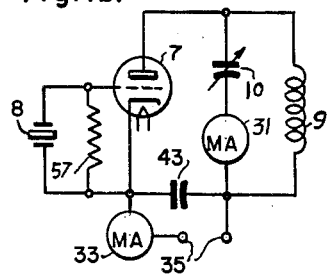
Fig. 2.
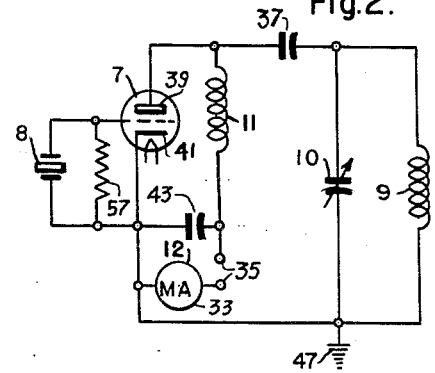
Fig. 3.
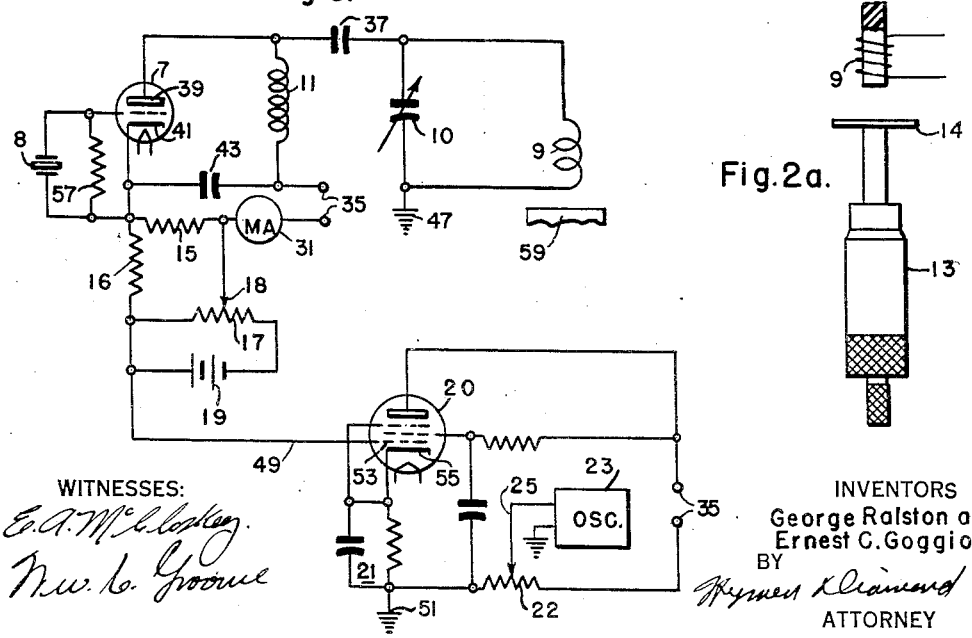
Fig. 2a.
WITNESSES:
INVENTORS
George Ralston and
Ernest C. Goggio.
BY
ATTORNEY INVENTORS
George Ralston and
Ernest C. Goggio.

Patented Sept. 16, 1952

2,611,020

UNITED STATES PATENT OFFICE 2,611,020

CRYSTAL OSCILLATOR ULTRAMICROMETER

George Ralston, Wilkinsburg, Pa., and Ernest Charles Goggio, Baltimore, Md., assignors to Westinghouse Electric Corporation, East Pittsburgh, Pa., a corporation of Pennsylvania Application March 16, 1949, Serial No. 81,666

4 Claims. (Cl. 177—351)

This invention relates to a crystal oscillator ultra-micrometer and, more particularly, to a method and apparatus for measuring small distance variations.

In perfecting the invention, advantage is taken of the high sensitivity and great stability of an electron tube oscillator using a crystal for frequency control and wherein the plate tank coil has its inductance controlled by the presence of a metal plate, which may be movable, thereby producing variations in the energy generated by the oscillator.

Particular interest is centered in measuring arrangements of the type in which the object whose relative location is to be measured is not contacted, as may occur in a variety of laboratory measurements; in fact, such contact in many cases would not be permissible, as when the object is in motion as will be the case in many industrial measurements.

While non-contacting measuring devices offer the rather wide opportunity of measuring changes in capacitance, inductance or resistance, the attempts made in the past along this line have not been satisfactory, particularly in the range of very small distance variations. In measuring the capacitance between the plate and an object, it is a disadvantage that the mounting of the plate is necessarily rigid and must be located in proximity to the object, and that the stability requirements of the constant frequency oscillator used in producing the beat are extremely rigid. In case where it is a question of measuring the mutual inductance between two coils, known apparatus is such as to make the inductance method impracticable when the size of the coil is limited. Again, in case of the resistance method utilizing a plate offering R.-F. resistance and brought near the coil of the oscillator tank circuit, appreciable sensitivity can be realized only if the plate be of high resistance material. In fact, all of these prior art instances can measure at best only about a 100 microampere change per 1 mil (1/1000″) height, or distance, variation.

It is, accordingly, an object of this invention to provide a highly sensitive electronic ultra-micrometer.

It is also an object of this invention to provide an electronic ultra-micrometer which is not only very sensitive but one which will measure extremely small distances, and at the same time, one wherein the pick-up head is simple and non-critical respecting its distance to the metal plate.

It is another object of the invention to provide an electronic ultra-micrometer which is not restricted as to the range of resistivity of the metal plate.

It is a further object of the invention to provide a measuring device wherein the produced energy variations are substantially linear with distance.

According to the invention there is provided a highly sensitive, preferably crystal controlled, electron tube oscillator having a plate-tank circuit. By tuning the tank circuit at near resonance, a range of D.-C. plate current or A.-C. tank current, values substantially linear with capacitor setting is obtained. With the tank circuit thus tuned, the inductance variations in the coil thereof, due to distance changes therefrom of a metal plate, are utilized to produce corresponding current changes in the oscillator plate circuit or voltage changes in the tank circuit. A resistance load circuit which may be adjustable is coupled in the plate circuit and means is included for feeding a predetermined amount of the voltage drop thereacross to an indicator such as an oscilloscope. This feeding means may include one or more amplification stages.

The foregoing and other objects of the invention and the invention itself will be better understood from the following detailed description of an embodiment thereof taken in connection with the accompanying drawings in which:

Figures 1a and 1b are diagrammatic views of plate and tank current characteristics of an oscillator according to various settings of the tank capacitor, and of the oscillator circuit itself, respectively.

Figure 2 is a diagrammatic showing of an oscillator used in making the characteristic curves below mentioned.

Figure 2a is a diagrammatic view of a micrometer screw device useful for calibrating the crystal oscillator ultra-micrometer.

Figure 3 is a diagrammatic showing of the combination of an oscillator-indicator system according to the invention.

Figure 4:
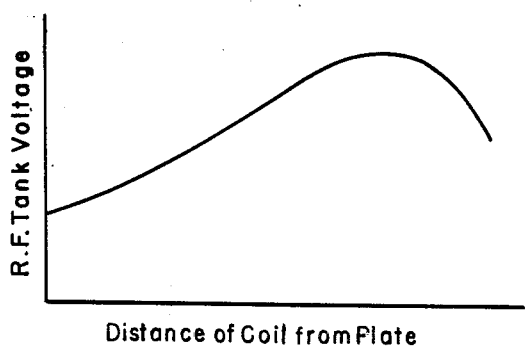
Figure 4 is a graph showing the sensitivity of the crystal oscillator ultra-micrometer as based on the characteristic of tank voltage versus coil distance.

Referring to Figure 1a, there is here indicated the changes in D.-C. plate current and A.-C. tank circuit current as an oscillator of the type shown in Figure 1b is tuned by its tank capacitor through various angles of its setting. Capacitor plate setting is plotted as the abscissa and R. F. tank current and D. C. plate current as ordinates. Curve A represents R. F. tank current and curve B represents D. C. plate current. It will be noted that the oscillator circuit as shown in Figure 1b, and which in itself is known, has a frequency controlling crystal 8 connected across a grid resistance 57 in the grid cathode circuit of the oscillator tube 7, and a tunable plate circuit, comprising a tank capacitor and a tank inductance 9. An ammeter 31 is connected in the tunable plate circuit to read R. F. tank current. An ammeter 33 is connected in series with D. C. plate supply terminals 35 to read D. C. plate current. With suitable energizing voltage values assigned to the oscillator, then as the tank capacitor 10 is tuned from a zero position where the D.-C. plate current has a given value at 1 (curve B), this value remains practically constant until a point 2 is reached corresponding in a particular case to, say, 87 degrees of the capacitor setting where this plate current suddenly drops to a given value at 3. Thereafter, as the capacitor 10 is further adjusted in the same direction, the value of this plate current drops further and substantially linearly to a point 4. Still further tuning of the capacitor 10 will cause the D.-C. plate current to rise substantially to its first value as indicated at 5 and thereafter practically continue constant. Meanwhile, at a tuning point indicated at 3', corresponding to 3, the A.-C. tank current begins to flow and increases substantially linearly to a value corresponding approximately to the D.-C. value at point 4 and thereafter, rises at an angle to its previous rise and substantially linearly to the point 4' corresponding approximately to the tuning position of the point 5. Further setting of the capacitor 10 in the same direction produces stoppage of oscillations and hence of said A.-C. tank current. The foregoing indicates the existence of both of said types of current-flow over a critical range of capacitor setting in which current-flow is substantially linear with said setting.

In Figure 2 there is illustrated a circuit of an oscillator of the above mentioned type, with indicated connections therefrom adapted to produce the curves shown in Figures 4–7. For the metal plate a copper plate 14 was used whose distance from the tank coil could be varied by a micrometer screw device 13 to which the copper plate 14 was attached, the mechanical set-up of which is shown in Figure 2a. This oscillator comprises an electron tube 7 which, though shown as a triode, may be any suitable type of a tube, having in its grid cathode circuit a control crystal 8, and in its plate-cathode circuit, a tank circuit comprising an inductance coil 9 and variable capacitor 10, one terminal of the tank circuit being connected through a blocking condenser 37 to the plate electrode 39 of the tube 7 and the other terminal to the cathode 41. The plate 39 of the oscillator tube 7 is shunt-fed through an inductance 11 which is coupled at its lower terminal by a blocking condenser 43 to the said cathode. Radio frequency voltage is obtainable by coupling it to the tank coil 9. D. C. plate potential is supplied to terminals 35 which are connected in series with a D. C. plate current ammeter 33, across the blocking condenser 43. The cathode 41 of the oscillator tube is grounded at 47. By adjustment of the micrometer screw device 13, the distance between the copper plate 14 and the tank circuit coil 9 may be varied to vary the inductance of the oscillator tank circuit and thus produce the aforesaid changes in R. F. tank voltage or D.-C. plate current.

The arrangement shown in Figure 3 represents the essentials of a complete circuit diagram of one embodiment of the invention, and employs the same reference characters for corresponding parts of Figure 2. Additionally, there are details of the D.-C. plate current output circuit, comprising a measuring series resistance 15 and a balancing circuit including a final recording resistance 16 having one of its terminals connected to the cathode end of resistance 15 and its other terminal connected by way of a potentiometric resistance 17 and slider 18 to the other terminal of resistance 15, said potentiometric resistance being energized by any suitable source 19. Said other end of resistance 16 is coupled by lead 49 to an indicating system.

When it is deemed advisable to increase the D.-C. output of the oscillator or to improve the correlation between oscillator and indicator, a direct current amplifier may be used. As shown, this amplifier comprises a pentode tube 20, which could be any other suitable tube, to whose control grid 53 the said lead 49 is connected. The cathode 55 of this pentode is grounded at 51 through a biasing parallel resistance condenser combination 21 and the output is derived from an adjustable contact on a series resistance 22 in the plate circuit with ground return or equivalent, such output being extended by a lead 25 to an oscilloscope 23. Since the oscilloscope itself and its mode of operation are well known it is not necessary to show or describe it in detail.

The object 59 in which height variations are to be determined, is placed in the field of the tank inductance coil 9.

In operation, it is obvious that, with proper adjustment of the above described circuit apparatus, the beam of the oscilloscope will be deflected a given amount in dependence on the value of current derived from the oscillator through the amplifier, when used, such current value in turn varying with the proximity to the tank coil 9 of the object 59, height variations of which are to be determined. The screen of the oscilloscope may be calibrated so that such distances can be directly read thereon. For the purpose of calibration the micrometer screw device 13 shown in Figure 2a may be used. By adjustment of the micrometer screw, the copper plate 14 may be made to change its position with respect to the coil 9 by a known amount, and the oscilloscope beam is deflected accordingly. Thus a certain oscilloscope deflection corresponds to an accurately measured height or distance variation. This calibration is independent of tube condition and exact value of plate or filament voltage.

Figure 5:
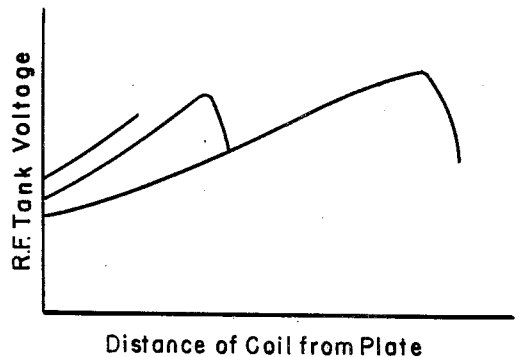
Figure 5 is a similar graph but showing different sensitivities as based on different parametric values.

Referring now to Figures 4 and 5, there are here shown sensitivity curves based on the tank voltage versus distance of coil 9 from plate 14 characteristic of the crystal oscillator operated in the manner above described. From this characteristic as shown in Figure 4 a sensitivity of the order of 53 millivolts per mil was obtained. In Figure 5 are shown a plurality of such curves based on different parametric values effected by adjustment of plate current of the oscillator, the respective curves showing increasing values of sensitivity as 87, 122 and 147 millivolts per mil.

Figure 6:
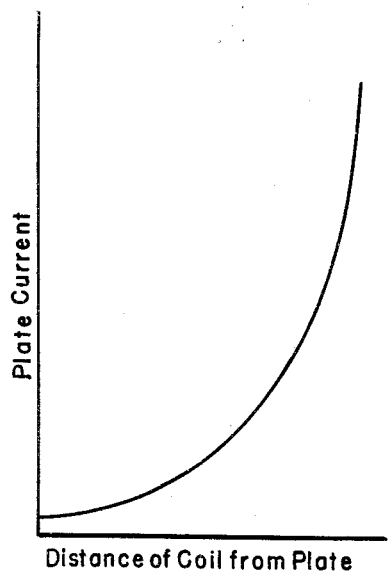
Figure 6 is a graph showing a plate current-coil distance characteristic of the oscillator.
Figure 7:
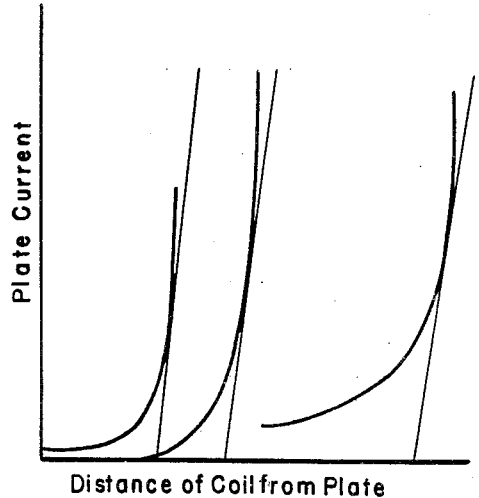
Figure 7 is a graph similar to that of Figure 6 showing different sensitivities based on the plate current-coil distance characteristic as determined by different parametric values of the coil distance.

In Figs. 6 and 7 the curves are analogous to those above described but are based on the plate current-distance of coil 9 from plate 14 characteristic which exhibits a high sensitivity for small height variations. From these curves, a sensitivity as high as 2 ma. per mil is shown, and from this characteristic a high sensitivity of 3 ma. per mil has been obtained with no loss in stability. The curves of Figure 7 indicate a range of sensitivity varying with the parametric ranges of distance of coil from plate.

The crystal oscillator ultra-micrometer as hereing described is not only a highly sensitive instrument for measuring small distances but also one which can be made to measure extremely small distance or height changes, the only practical limit in this respect being the stability of the oscillator. With a galvanometer requiring .0047 ma./mm., this device will measure down to $4.25 \times 10^{-8}$ inches, when using a sensitivity of 2 ma. per mil.

It is obvious that considerable latitude exists respecting the design of a circuit apparatus according to the invention. By way of example only, one set of values of circuit elements which has been found suitable is as follows, referring to Figure 2: Crystal 8, 3.807 megacycles, grid leak resistance 57, 10 megohms, tank coil 9, 2 microhenries, tank capacitor 10, 500–1000 micro-microfarads, R. F. choke 11, 50 millihenries, blocking condensers 37, 43, .01 microfarad.

Other obvious variations within the scope of the invention are possible and the invention is not to be regarded as limited by the use of specific elements employed in describing it unless expressly so indicated.

We claim as our invention:

1. An electronic ultra micrometer for measuring distance variation between two elements comprising a crystal controlled electron tube oscillator comprising an oscillator tube having a cathode, a plate, and a grid and having a tank circuit including an inductance and a capacitance, means for tuning said tank circuit, said inductance constituting the first of said elements, the second of said elements being of metal and positioned in the field of said inductance and means for measuring variations of energy in the tank circuit of said oscillator corresponding to variations in distance between said elements, said tank circuit being adjusted so that the region of operation of the circuit is on the steep portion of the oscillator plate current characteristic, in which region a tank circuit inductance effect corresponding to a relatively small variation in distance between said elements will produce a relatively large change in the oscillator plate current.

2. An electronic ultra micrometer according to claim 1, wherein said energy variation characteristic is that of oscillator plate direct current.

3. An electronic ultra micrometer according to claim 1, wherein said energy variation characteristic is that of the tank circuit oscillation.

4. An electronic ultra-micrometer according to claim 1, wherein said energy variation is that of the direct current in the oscillator plate circuit and there is included an oscilloscope indicating system and means for coupling said indicating system to said plate circuit, including a balancing circuit comprising a resistance in said plate circuit and an output resistance in series with a potentiometric resistance connected in parallel with said plate resistance.

GEORGE RALSTON.
ERNEST CHARLES GOGGIO.

REFERENCES CITED

The following references are of record in the file of this patent:

UNITED STATES PATENTS

| Number | Name | Date |
|---|---|---|
| 1,778,827 | Evans | Oct. 21, 1930 |
| 1,848,490 | Nicolson | Mar. 8, 1932 |
| 1,946,924 | Allen | Feb. 13, 1934 |
| 2,083,759 | Temple | June 15, 1937 |
| 2,261,815 | Thompson | Nov. 4, 1941 |
| 2,414,224 | Douglas | Jan. 14, 1947 |
| 2,439,047 | Grinstead | Apr. 6, 1948 |
| 2,452,156 | Schover | Oct. 26, 1948 |

FOREIGN PATENTS

| Number | Country | Date |
|---|---|---|
| 275,741 | Great Britain | Feb. 17, 1927 |